United States Patent
Sakai et al.

(10) Patent No.: US 11,498,455 B2
(45) Date of Patent: Nov. 15, 2022

(54) FUEL CELL SYSTEM, CONTROL METHOD THEREFOR, AND NON-TRANSITORY COMPUTER-READABLE STORAGE MEDIUM IN WHICH A PROGRAM IS STORED

(71) Applicant: HONDA MOTOR CO., LTD., Tokyo (JP)

(72) Inventors: Ryoji Sakai, Wako (JP); Akihiro Matsui, Wako (JP); Kuniaki Ojima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 541 days.

(21) Appl. No.: 16/654,036

(22) Filed: Oct. 16, 2019

(65) Prior Publication Data

US 2020/0122605 A1 Apr. 23, 2020

(30) Foreign Application Priority Data

Oct. 18, 2018 (JP) .............................. JP2018-196794

(51) Int. Cl.
*B60L 50/50* (2019.01)
*B60L 58/34* (2019.01)
*B60H 1/00* (2006.01)

(52) U.S. Cl.
CPC .......... *B60L 58/34* (2019.02); *B60H 1/00385* (2013.01); *B60L 50/50* (2019.02)

(58) Field of Classification Search
CPC ......... B60L 50/10–50; B60L 58/10–14; B60L 58/24; B60L 58/31–34; B60H 1/00385;
(Continued)

(56) References Cited

U.S. PATENT DOCUMENTS 8,158,293 B2 4/2012 Naganuma et al.
2009/0291341 A1 11/2009 Miyata et al.
(Continued)

FOREIGN PATENT DOCUMENTS

JP 2005-073464 3/2005
JP 2006-128029 5/2006
(Continued)

OTHER PUBLICATIONS

Japanese Office Action for Japanese Patent Application No. 2018-196794 dated Nov. 30, 2021.

*Primary Examiner* — Rexford N Barnie
*Assistant Examiner* — Swarna N Chowdhuri
(74) *Attorney, Agent, or Firm* — Amin, Turocy & Watson, LLP

(57) ABSTRACT

A fuel cell system includes an air pump configured to supply air to a fuel cell, and a discharge flow rate determination unit which determines a discharge flow rate of the air pump when warming up the fuel cell, in accordance with a speed of a vehicle in which the fuel cell and the air pump are installed, or a required drive output of the vehicle. The discharge flow rate determination unit increases the discharge flow rate in the case that the speed or the required drive output is greater than or equal to a predetermined threshold value, and decreases the discharge flow rate in the case that the speed or the required drive output is less than the predetermined threshold value.

4 Claims, 4 Drawing Sheets

(58) Field of Classification Search
CPC ............. B60K 15/00–03; Y02E 60/50; H01M 8/04268; H01M 8/04302
USPC ........................................................ 429/428
See application file for complete search history.

(56) References Cited

U.S. PATENT DOCUMENTS

| | | |
|---|---|---|
| 2010/0047630 A1 | 2/2010 | Imanishi et al. |
| 2011/0293972 A1* | 12/2011 | Naganuma ........ H01M 8/04007 429/9 |
| 2013/0040219 A1 | 2/2013 | Naganuma et al. |
| 2015/0180070 A1* | 6/2015 | Matsusue ............ H01M 8/1004 429/432 |
| 2019/0270392 A1* | 9/2019 | Sakai ................ H01M 8/04089 |

FOREIGN PATENT DOCUMENTS

| | | |
|---|---|---|
| JP | 2008-103250 | 5/2008 |
| JP | 2009-281262 | 12/2009 |
| WO | 2011-135610 | 3/2011 |
| WO | 2011/148426 | 12/2011 |

* cited by examiner

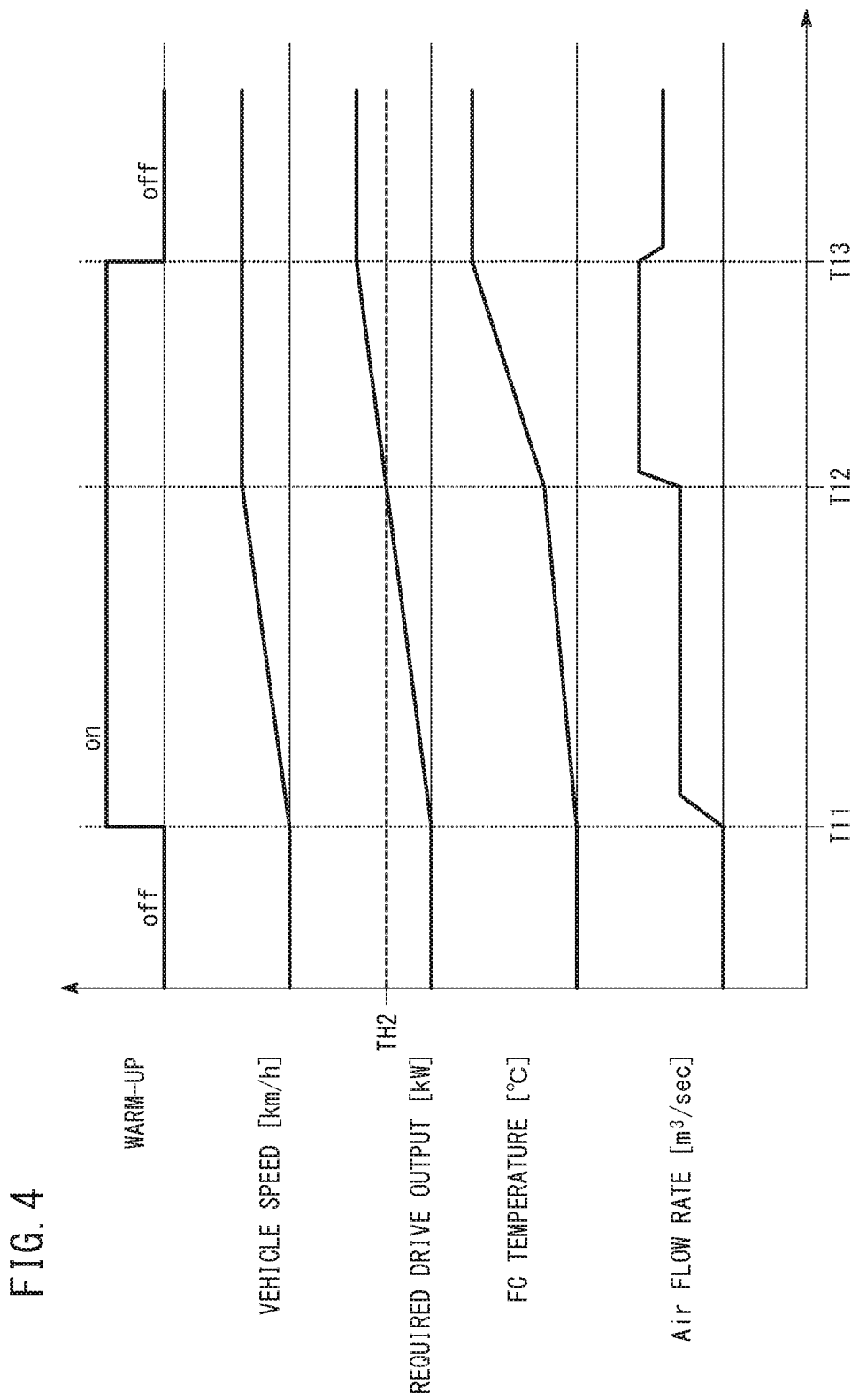

FUEL CELL SYSTEM, CONTROL METHOD THEREFOR, AND NON-TRANSITORY COMPUTER-READABLE STORAGE MEDIUM IN WHICH A PROGRAM IS STORED

CROSS-REFERENCE TO RELATED APPLICATION

This application is based upon and claims the benefit of priority from Japanese Patent Application No. 2018-196794 filed on Oct. 18, 2018, the contents of which are incorporated herein by reference.

BACKGROUND OF THE INVENTION

Field of the Invention

The present invention relates to a fuel cell system, a control method therefor, and a non-transitory computer-readable storage medium in which a program is stored.

Description of the Related Art

Recently, fuel cell vehicles in which a fuel cell is used have attracted significant attention. The operating temperature of a fuel cell is relatively high. Therefore, at a time of starting the fuel cell, it is important for the fuel cell to be heated. Such a process is referred to as warming up the fuel cell.

In Japanese Laid-Open Patent Publication No. 2008-103250, a process such as the one discussed below is disclosed. More specifically, according to Japanese Laid-Open Patent Publication No. 2008-103250, a required output power of the fuel cell is calculated on the basis of sensor signals transmitted from an SOC sensor, a speed of rotation detecting sensor, and the like. Then, an output current command value is calculated on the basis of an IV characteristic map corresponding to the required output power of the fuel cell, and a minimum drive voltage of a traction motor. In addition, an air stoichiometric ratio is determined based on the output current command value, and the flow rate of an oxygen-containing gas is calculated on the basis of the air stoichiometric ratio.

SUMMARY OF THE INVENTION

However, in the case that warming up of the fuel cell is simply performed in this manner, the noise and vibration from the air pump may cause discomfort to a user.

An object of the present invention is to provide a fuel cell system, a control method therefor, and a computer-readable non-transitory storage medium in which a program is stored, which are capable of performing a warm-up process while preventing any sense of discomfort from being imparted to the user.

A fuel cell system according to one aspect of the present invention comprises a fuel cell, an air pump configured to supply air to the fuel cell, a discharge flow rate determination unit configured to determine a discharge flow rate of the air pump when warming up the fuel cell, in accordance with a speed of a vehicle in which the fuel cell and the air pump are installed, or a required drive output of the vehicle, and a control unit configured to control the air pump on a basis of the discharge flow rate determined by the discharge flow rate determination unit, wherein the discharge flow rate determination unit increases the discharge flow rate in a case that the speed or the required drive output is greater than or equal to a predetermined threshold value, and decreases the discharge flow rate in a case that the speed or the required drive output is less than the predetermined threshold value.

In a control method for a fuel cell system according to another aspect of the present invention, there are included a fuel cell, and an air pump configured to supply air to the fuel cell, the control method comprising a step of determining a discharge flow rate of the air pump when warming up the fuel cell, on a basis of a speed of a vehicle in which the fuel cell and the air pump are installed, or a required drive output of the vehicle, and a step of controlling the air pump on a basis of the discharge flow rate determined in the step of determining the discharge flow rate, wherein, in the step of determining the discharge flow rate, the discharge flow rate is increased in a case that the speed or the required drive output is greater than or equal to a predetermined threshold value, and the discharge flow rate is decreased in a case that the speed or the required drive output is less than the predetermined threshold value.

A non-transitory computer-readable storage medium in which a program is stored, is provided according to still another aspect of the present invention. A computer is provided in a fuel cell system that includes a fuel cell and an air pump configured to supply air to the fuel cell, and the program serves to execute in the computer a step of determining a discharge flow rate of the air pump when warming up the fuel cell, on a basis of a speed of a vehicle in which the fuel cell and the air pump are installed, or a required drive output of the vehicle, and a step of controlling the air pump on a basis of the discharge flow rate determined in the step of determining the discharge flow rate of the air pump, wherein, in the step of determining the discharge flow rate, the discharge flow rate is increased in a case that the speed or the required drive output is greater than or equal to a predetermined threshold value, and the discharge flow rate is decreased in a case that the speed or the required drive output is less than the predetermined threshold value.

According to the present invention, it is possible to provide the fuel cell system, the control method therefor, and the computer-readable non-transitory storage medium in which the program is stored, which are capable of performing a warm-up process while preventing any sense of discomfort from being imparted to the user.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 4 is a time chart showing another example of operations of the fuel cell system according to the embodiment.

DESCRIPTION OF THE PREFERRED EMBODIMENTS

Preferred embodiments of a fuel cell system according to the present invention, a control method therefor, and a computer-readable non-transitory storage medium in which a program is stored will be presented and described in detail below with reference to the accompanying drawings.

Embodiments

Figure 1:
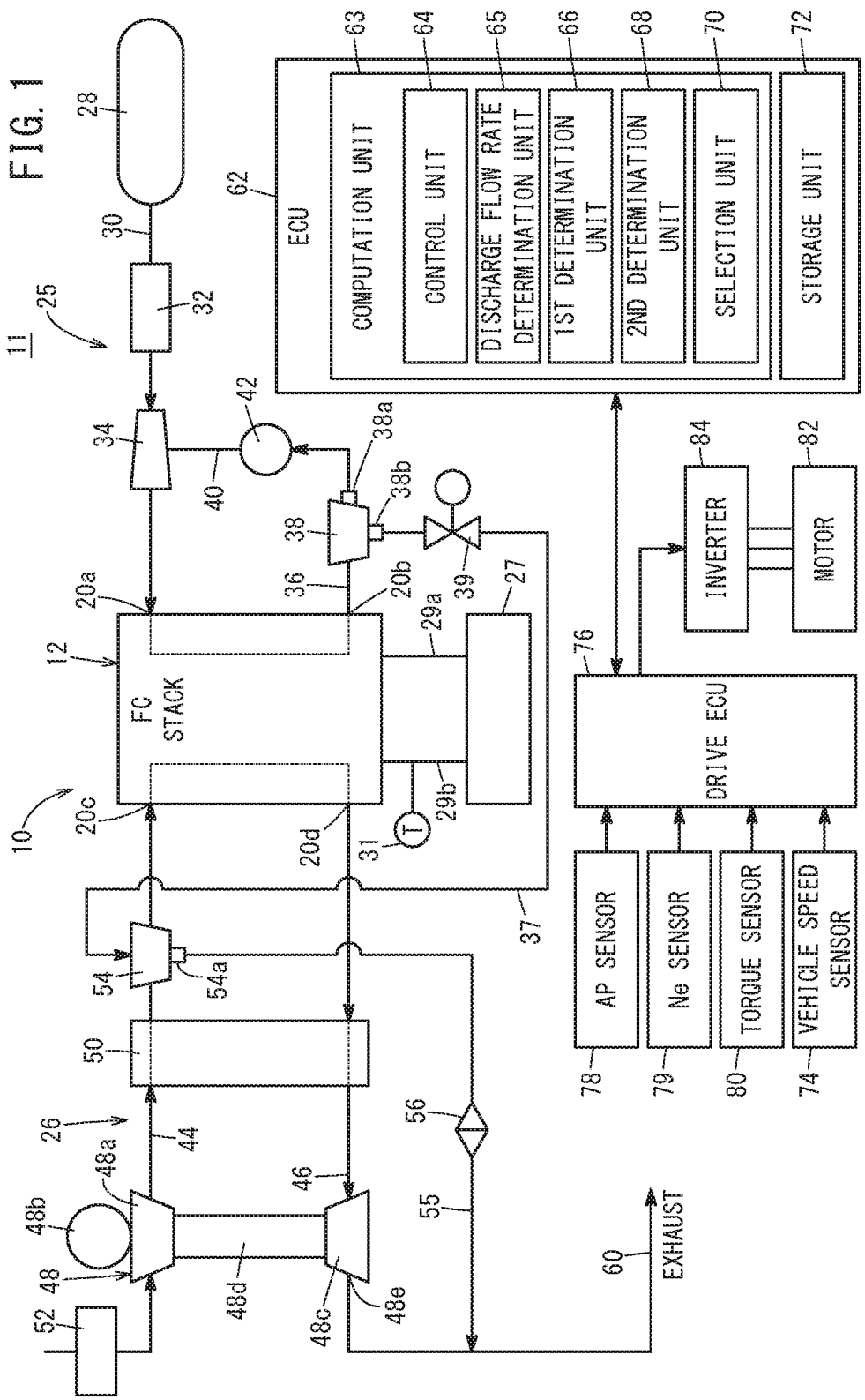
FIG. 1 is a block diagram showing a vehicle equipped with a fuel cell system according to an embodiment of the present invention.

A description will be given with reference to the drawings concerning a fuel cell system according to an embodiment of the present invention, a control method therefor, and a computer-readable non-transitory storage medium in which a program is stored. FIG. 1 is a block diagram showing a vehicle equipped with the fuel cell system according to the present embodiment.

As shown in FIG. 1, a vehicle 11 is equipped with a fuel cell system 10 according to the present embodiment. The vehicle 11 is a fuel cell vehicle, and more specifically, is a fuel cell electric vehicle. On the vehicle 11, there is provided an exhaust pipe 60, which discharges to the exterior of the vehicle 11 a cathode exhaust gas that flows out from the fuel cell system 10.

The vehicle 11 is further equipped with an ECU (Electronic Control Unit) 62, which administers the control of the fuel cell system 10 as a whole together with carrying out predetermined processes, and a drive ECU 76. The vehicle 11 is also equipped with a brake ECU, although illustration of this feature is omitted herein. In the vehicle 11, there is further provided an inverter 84 that converts DC power supplied from the fuel cell system 10 into AC drive power for driving a motor 82. Moreover, in the vehicle 11, there is further provided the motor 82 which is operated by the drive power supplied from the inverter 84.

The vehicle 11 is further equipped with an accelerator pedal sensor (AP sensor) 78 that detects an amount by which a non-illustrated accelerator pedal is operated, and a speed of rotation sensor (Ne sensor) 79 that detects the speed of rotation (number of rotations) of the motor 82 per unit time. In addition, the vehicle 11 is further provided with a torque sensor 80 that detects the torque of the motor 82 (motor torque), and a vehicle speed sensor 74 that detects the speed of the vehicle 11. Moreover, the vehicle 11 is equipped with other constituent elements apart from the constituent elements noted above. However, description of such elements is omitted herein.

A computation unit 63 and a storage unit 72 are provided in the ECU 62. The computation unit 63 can be constituted, for example, by a CPU (Central Processing Unit). The computation unit 63 serves to control each of respective units of the fuel cell system 10 on the basis of programs that are stored in the storage unit 72. The computation unit 63 comprises a control unit 64, a discharge flow rate determination unit 65, a first determination unit 66, a second determination unit 68, and a selection unit 70. The control unit 64, the discharge flow rate determination unit 65, the first determination unit 66, the second determination unit 68, and the selection unit 70 can be realized by programs which are stored in the storage unit 72 being executed by the computation unit 63.

The first determination unit 66 determines a warm-up discharge flow rate based on the speed of the vehicle 11. The warm-up discharge flow rate is a discharge flow rate which is determined from among the discharge flow rates of an air pump 48, and is used for the purpose of warming up a fuel cell stack 12. In the case that warming up of the fuel cell stack 12 is carried out while the vehicle 11 is traveling, generation of power (normal generation of power) for enabling the vehicle 11 to travel is also necessary. Therefore, in the case that warming up of the fuel cell stack 12 is carried out while the vehicle 11 is traveling, a discharge flow rate obtained by adding the warm-up discharge flow rate and the discharge flow rate for normal generation of power is set for the discharge flow rate of the air pump 48 at the time of the warm-up operation. The second determination unit 68 determines the warm-up discharge flow rate based on a required drive output of the vehicle 11. The required drive output of the vehicle 11 is a power, an electrical power, or a torque that is required and consumed when the vehicle 11 is driven, and can be calculated on the basis of accelerator opening information, which is indicative of the amount by which the accelerator pedal is operated by the user.

In the case that the speed of the vehicle 11 is less than a first threshold value TH1, the first determination unit 66 determines that the warm-up discharge flow rate is a first flow rate. Further, in the case that the speed of the vehicle 11 is greater than or equal to the first threshold value TH1, the first determination unit 66 determines that the warm-up discharge flow rate is a second flow rate which is larger than the first flow rate. In the case that the required drive output of the vehicle 11 is less than a second threshold value TH2, the second determination unit 68 determines that the warm-up discharge flow rate is a third flow rate. Further, in the case that the required drive output of the vehicle 11 is greater than or equal to the second threshold value TH2, the second determination unit 68 determines that the warm-up discharge flow rate is a fourth flow rate which is larger than the third flow rate.

The selection unit 70 selects the larger one from among the warm-up discharge flow rate determined by the first determination unit 66 and the warm-up discharge flow rate determined by the second determination unit 68. The discharge flow rate determination unit 65 determines the discharge flow rate of the air pump 48 on the basis of the warm-up discharge flow rate selected by the selection unit 70. In this manner, the discharge flow rate determination unit 65 determines the discharge flow rate of the air pump 48 on the basis of the warm-up discharge flow rate determined by the first determination unit 66, and the warm-up discharge flow rate determined by the second determination unit 68. The discharge flow rate determination unit 65 determines the discharge flow rate of the air pump 48 when warming up the fuel cell stack 12, in accordance with the speed of the vehicle 11 or the required drive output of the vehicle 11. The discharge flow rate determination unit 65 increases the discharge flow rate in the case that the speed of the vehicle 11 or the required drive output of the vehicle 11 is greater than or equal to a predetermined threshold value, and decreases the discharge flow rate in the case that the speed of the vehicle 11 or the required drive output of the vehicle 11 is less than the predetermined threshold value. The control unit 64 controls the later-described air pump 48 based on the discharge flow rate determined by the discharge flow rate determination unit 65.

The drive ECU 76 administers the control of the drive system as a whole including the motor 82. The drive ECU 76 controls the driving force (drive output) of the motor 82, on the basis of the amount by which the accelerator pedal is operated, the speed of rotation of the motor 82, the torque of the motor 82, and the speed of the vehicle 11. More specifically, the drive ECU 76 controls the driving force of the motor 82 by controlling the inverter 84.

The fuel cell system 10 comprises a fuel cell stack (FC STACK, fuel cell) 12 which performs generation of power using a fuel gas and an oxygen-containing gas. The fuel cell system 10 is equipped with a fuel gas supply device 25 that supplies a fuel gas (for example, hydrogen gas) to the fuel cell stack 12, and an oxygen-containing gas supply device 26 that supplies air, which is an oxygen-containing gas, to the fuel cell stack 12. In the fuel cell system 10, there is further provided a non-illustrated battery serving as an energy storage device. The fuel cell stack 12 is further equipped with a coolant supply device 27 that supplies a coolant to the fuel cell stack 12.

The fuel cell stack 12 is constituted by stacking a plurality of non-illustrated power generation cells. Each of the power generation cells is constituted by sandwiching a membrane electrode assembly (MEA) between separators.

Such a membrane electrode assembly is constituted by disposing an anode on one surface of an electrolyte membrane, and disposing a cathode on another surface of the electrolyte membrane. As the electrolyte membrane, for example, a polymer ion exchange membrane is used.

Generation of electrical power is carried out by supplying a fuel gas containing hydrogen to the anode, and supplying an oxygen-containing gas containing oxygen to the cathode.

The fuel gas supply device 25 includes a fuel gas tank 28 that stores a high pressure fuel gas (high-pressure hydrogen), a fuel gas supply line 30 that guides the fuel gas to the fuel cell stack 12, and an injector 32 disposed in the fuel gas supply line 30. The fuel gas supply device 25 further includes an ejector 34 provided on a downstream side of the injector 32. The fuel gas supply line 30 is connected to a fuel gas inlet port 20a of the fuel cell stack 12. A fuel gas injection device is constituted by the injector 32 and the ejector 34.

A fuel gas discharge line 36 is connected to a fuel gas outlet port 20b of the fuel cell stack 12. The fuel gas discharge line 36 directs an anode exhaust gas (fuel off gas), which is a fuel gas that has been at least partially used in the anodes of the fuel cell stack 12, outwardly from the fuel cell stack 12. A circulation line 40 is connected to the fuel gas discharge line 36. The circulation line 40 guides the anode exhaust gas to the ejector 34. A hydrogen pump 42 (circulation pump) is disposed in the circulation line 40. It should be noted that the hydrogen pump 42 need not necessarily be provided.

A gas-liquid separator 38 is disposed in the fuel gas discharge line 36. A connection line 37 is connected to a liquid discharge port 38b of the gas-liquid separator 38. A drain valve 39, which is controlled to be opened and closed by the control unit 64, is provided in the connection line 37.

The oxygen-containing gas supply device 26 includes an oxygen-containing gas supply line 44 connected to an oxygen-containing gas inlet port 20c of the fuel cell stack 12, and an oxygen-containing gas discharge line 46 connected to an oxygen-containing gas outlet port 20d of the fuel cell stack 12. The oxygen-containing gas supply device 26 further includes the air pump 48 that supplies air toward the fuel cell stack 12, and a humidifier 50 that humidifies the air supplied to the fuel cell stack 12.

The air pump 48 includes a compressor 48a that compresses air, a motor 48b that rotatably drives the compressor 48a, and an expander 48c (regenerating mechanism) coupled to the compressor 48a. The air pump 48 is controlled by the control unit 64. The compressor 48a is disposed in the oxygen-containing gas supply line 44. In the oxygen-containing gas supply line 44, an air cleaner 52 is disposed on a more upstream side than the compressor 48a. Air is introduced into the compressor 48a through the air cleaner 52.

The expander 48c is disposed in the oxygen-containing gas discharge line 46. An impeller of the expander 48c is connected via a connecting shaft 48d to an impeller of the compressor 48a. The impeller of the compressor 48a, the connecting shaft 48d, and the impeller of the expander 48c rotate integrally about an axis of rotation (not shown). The cathode exhaust gas is introduced into the impeller of the expander 48c, and fluid energy is regenerated from the cathode exhaust gas. The regenerative energy covers a portion of the driving force for rotating the compressor 48a.

The humidifier 50 includes a large number of hollow fiber membranes through which moisture can permeate. By way of such hollow fiber membranes, moisture is exchanged between the air directed toward the fuel cell stack 12, and the high humidity cathode exhaust gas discharged from the fuel cell stack 12. In this manner, the air directed toward the fuel cell stack 12 is humidified.

In the oxygen-containing gas supply line 44, a gas-liquid separator 54 is disposed between the humidifier 50 and the oxygen-containing gas inlet port 20c of the fuel cell stack 12. The connection line 37 is connected to the gas-liquid separator 54. One end of a drain pipe 55 is connected to a liquid discharge port 54a of the gas-liquid separator 54. Another end of the drain pipe 55 is connected to the exhaust pipe 60. An orifice 56 is disposed in the drain pipe 55. It should be noted that the gas-liquid separator 54 need not necessarily be provided. In the case that the gas-liquid separator 54 is not provided, the connection line 37 may be directly connected to the oxygen-containing gas supply line 44.

The exhaust pipe 60 is connected to an outlet port 48e of the expander 48c. The exhaust pipe 60 extends from the outlet port 48e of the expander 48c, and extends to a rear part of the vehicle body along the bottom of the vehicle body (not shown).

The coolant supply device 27 supplies a coolant to the fuel cell stack 12 via a pipe 29a. The coolant that is supplied to the fuel cell stack 12 is returned to the coolant supply device 27 via a pipe 29b. A temperature sensor 31 is provided in the pipe 29b. The temperature sensor 31 is capable of detecting the temperature of the fuel cell stack 12.

The vehicle speed sensor 74 detects the speed, i.e., the vehicle speed V, of a vehicle body (not shown) of the vehicle 11, and outputs the detected vehicle speed V to the ECU 62. The vehicle speed sensor 74 detects the vehicle speed V on the basis of, for example, the rotation of a counter shaft (not shown) of a transmission (not shown).

At a time of normal operation, the fuel cell system 10 operates in the following manner. More specifically, in the fuel gas supply device 25, the fuel gas is supplied from the fuel gas tank 28 to the fuel gas supply line 30. At this time, the fuel gas is injected by the injector 32 toward the ejector 34, and via the ejector 34, is introduced from the fuel gas inlet port 20a into a fuel gas flow passage inside the fuel cell stack 12, and is supplied to the anode.

On the other hand, in the oxygen-containing gas supply device 26, the air pump 48 (compressor 48a) is rotated, and air which forms the oxygen-containing gas is delivered to the oxygen-containing gas supply line 44. After being humidified by the humidifier 50, the air is introduced from the oxygen-containing gas inlet port 20c into an oxygen-containing gas flow passage inside the fuel cell stack 12, and is supplied to the cathode. In each of the power generation cells, the fuel gas supplied to the anode, and the oxygen contained within the air supplied to the cathode are partially consumed by electrochemical reactions within the electrode catalyst layers, whereby generation of electrical power is carried out.

Fuel gas that has not been consumed at the anodes is discharged from the fuel gas outlet port 20b into the fuel gas discharge line 36 as an anode exhaust gas. Liquid water discharged from the anodes is introduced into the gas-liquid separator 38 together with the anode exhaust gas. The anode exhaust gas is separated from the liquid water by the gas-liquid separator 38, and the anode exhaust gas flows into the circulation line 40 via a gas discharge port 38a of the gas-liquid separator 38. Based on an instruction from the control unit 64, the amount of liquid within the gas-liquid separator 38 is adjusted by opening or closing the drain valve 39. Moreover, when operation of the fuel cell stack 12 is stopped, the drain valve 39 is opened, and the liquid water within the gas-liquid separator 38 is discharged by gravity through the connection line 37 into the gas-liquid separator 54 that is provided in the oxygen-containing gas supply line 44. The liquid water is discharged from the gas-liquid separator 54 to the exterior of the vehicle via the drain pipe 55 and the exhaust pipe 60.

The anode exhaust gas is introduced into the ejector 34 from the fuel gas discharge line 36 via the circulation line 40. The anode exhaust gas introduced into the ejector 34 is mixed with the fuel gas that is injected by the injector 32, and the mixed gas is supplied to the fuel cell stack 12.

From the oxygen-containing gas outlet port 20d of the fuel cell stack 12, a humidified cathode exhaust gas, which contains oxygen that has not been consumed at the cathodes, and water, which is a reaction product produced at the cathodes, are discharged into the oxygen-containing gas discharge line 46. After exchange of moisture with the air directed toward the fuel cell stack 12 is carried out in the humidifier 50, the cathode exhaust gas is introduced into the expander 48c of the air pump 48. In the expander 48c, recovery (regeneration) of energy from the cathode exhaust gas is carried out, and the regenerative energy becomes a portion of the driving force for the compressor 48a. The cathode exhaust gas and water are discharged from the expander 48c into the exhaust pipe 60, and are released to the exterior of the vehicle through the exhaust pipe 60.

When operation of the fuel cell system 10 is initiated, in the case that the control unit 64 determines that warming up of the fuel cell stack 12 is required, the warm-up operation (warm-up process) is performed prior to the normal operation. For example, the control unit 64 is capable of determining whether or not warming up of the fuel cell stack 12 is required, on the basis of the temperature of the fuel cell stack 12 that is detected using the temperature sensor 31. During the warm-up operation, by an instruction from the control unit 64, the drain valve 39 provided in the connection line 37 that is connected to the gas-liquid separator 38 is opened. In addition, in the same manner as in the normal operation, the fuel gas is supplied to the anodes of the fuel cell stack 12 by the fuel gas supply device 25, together with the oxygen-containing gas being supplied to the cathodes of the fuel cell stack 12 by the oxygen-containing gas supply device 26, whereby generation of electrical power is carried out.

Since the drain valve 39 is opened, the fuel gas is introduced into the oxygen-containing gas supply line 44 via the connection line 37. Therefore, the fuel gas is supplied together with the oxygen-containing gas to the cathodes of the fuel cell stack 12. As a result, by the oxygen-containing gas and the fuel gas, an exothermic reaction (catalytic combustion) is generated at the cathode catalyst. The fuel cell stack 12 is rapidly heated by heat accompanying the exothermic reaction, and by heat accompanying the generation of power. In addition, in the case it is determined that a warm-up completion temperature has been reached, the drain valve 39 is closed, and the process transitions to the above-described normal operation.

Figure 2:
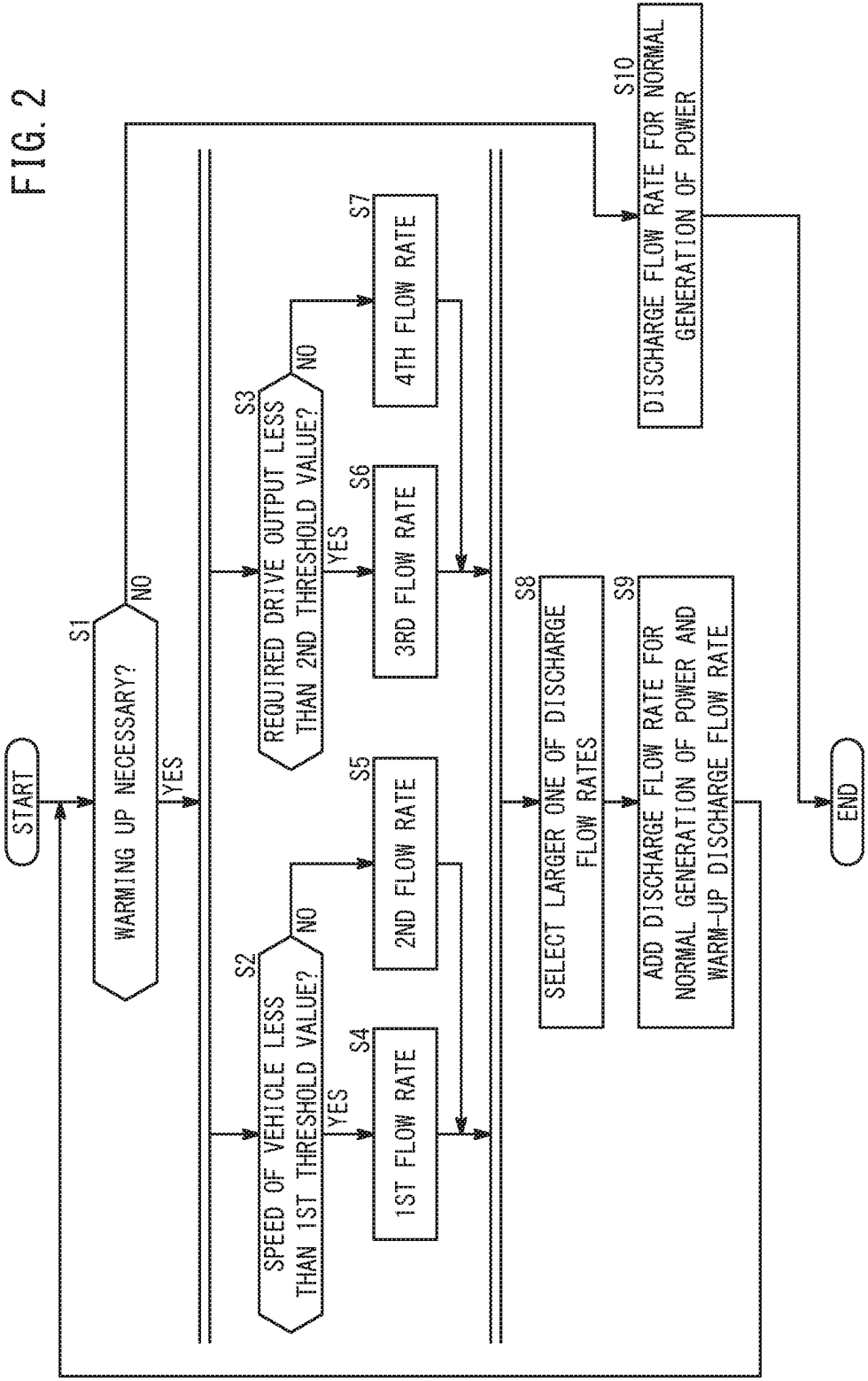
FIG. 2 is a flowchart showing operations of the fuel cell system according to the embodiment.

Operations of the fuel cell system according to the present embodiment will be described with reference to FIG. 2. FIG. 2 is a flowchart showing operations of the fuel cell system according to the present embodiment.

In step S1, based on the temperature detected by the temperature sensor 31, the control unit 64 determines whether or not it is necessary for the fuel cell stack 12 to be warmed up. In the case that the temperature detected by the temperature sensor 31 is less than a predetermined temperature, the control unit 64 determines that warming up of the fuel cell stack 12 is necessary. In this case, the process proceeds to step S2 and step S3. In the case that the temperature detected by the temperature sensor 31 is greater than or equal to the predetermined temperature, the control unit 64 determines that warming up of the fuel cell stack 12 is not necessary. In this case, the process transitions to step S10.

In step S2, the first determination unit 66 determines whether or not the speed of the vehicle 11 is less than the first threshold value TH1. In the case that the speed of the vehicle 11 is less than the first threshold value TH1, the process transitions to step S4. In the case that the speed of the vehicle 11 is greater than or equal to the first threshold value TH1, the process transitions to step S5.

In step S4, the first determination unit 66 determines that the warm-up discharge flow rate in the air pump 48 is the first flow rate. As discussed above, the warm-up discharge flow rate is a discharge flow rate which is used for the purpose of warming up the fuel cell stack 12. In the case that warming up of the fuel cell stack 12 is carried out while the vehicle 11 is traveling, generation of power for enabling the vehicle 11 to travel, namely, normal generation of power is also necessary. Therefore, as noted above, in the case that warming up of the fuel cell stack 12 is carried out while the vehicle 11 is traveling, the discharge flow rate obtained by adding the warm-up discharge flow rate and the discharge flow rate for normal generation of power is set for the discharge flow rate of the air pump 48 at the time of the warm-up operation. Thereafter, the process transitions to step S8.

In step S5, the first determination unit 66 determines that the warm-up discharge flow rate in the air pump 48 is the second flow rate. Thereafter, the process transitions to step S8.

In step S3, the second determination unit 68 determines whether or not the required drive output of the vehicle 11 is less than the second threshold value TH2. The required drive output of the vehicle 11 corresponds to the drive power supplied to the motor 82 from the inverter 84. The drive power supplied to the motor 82 from the inverter 84 is controlled by the drive ECU 76. In the case that the required drive output of the vehicle 11 is less than the second threshold value TH2, the process transitions to step S6. In the case that the required drive output of the vehicle 11 is greater than or equal to the second threshold value TH2, the process transitions to step S7.

In step S6, the second determination unit 68 determines that the warm-up discharge flow rate in the air pump 48 is the third flow rate. Thereafter, the process transitions to step S8.

In step S7, the second determination unit 68 determines that the warm-up discharge flow rate in the air pump 48 is the fourth flow rate. Thereafter, the process transitions to step S8.

In step S8, the selection unit 70 selects the larger one from among the warm-up discharge flow rate determined by the first determination unit 66 and the warm-up discharge flow rate determined by the second determination unit 68. Thereafter, the process transitions to step S9.

In step S9, the discharge flow rate determination unit 65 determines the discharge flow rate of the air pump 48 on the basis of the warm-up discharge flow rate selected by the selection unit 70. More specifically, the discharge flow rate determination unit 65 sets, as the discharge flow rate of the air pump 48, the discharge flow rate that is obtained by adding the flow rate for normal generation of power and the warm-up discharge flow rate selected by the selection unit 70. Moreover, using a predetermined map (table) or the like, the flow rate for normal generation of power can be determined appropriately based on the amount by which the accelerator pedal is operated, the speed of rotation of the motor 82, the torque of the motor 82, and the speed of the vehicle 11, etc. The control unit 64 controls the air pump 48 based on the discharge flow rate determined by the discharge flow rate determination unit 65. Thereafter, the process returns to step S1.

In step S10, on the basis of the flow rate for normal generation of power, the discharge flow rate determination unit 65 determines the discharge flow rate of the air pump 48. The control unit 64 controls the air pump 48 based on the discharge flow rate determined by the discharge flow rate determination unit 65.

By preforming the steps described above, the fuel cell system 10 according to the present embodiment is driven.

Figure 3:
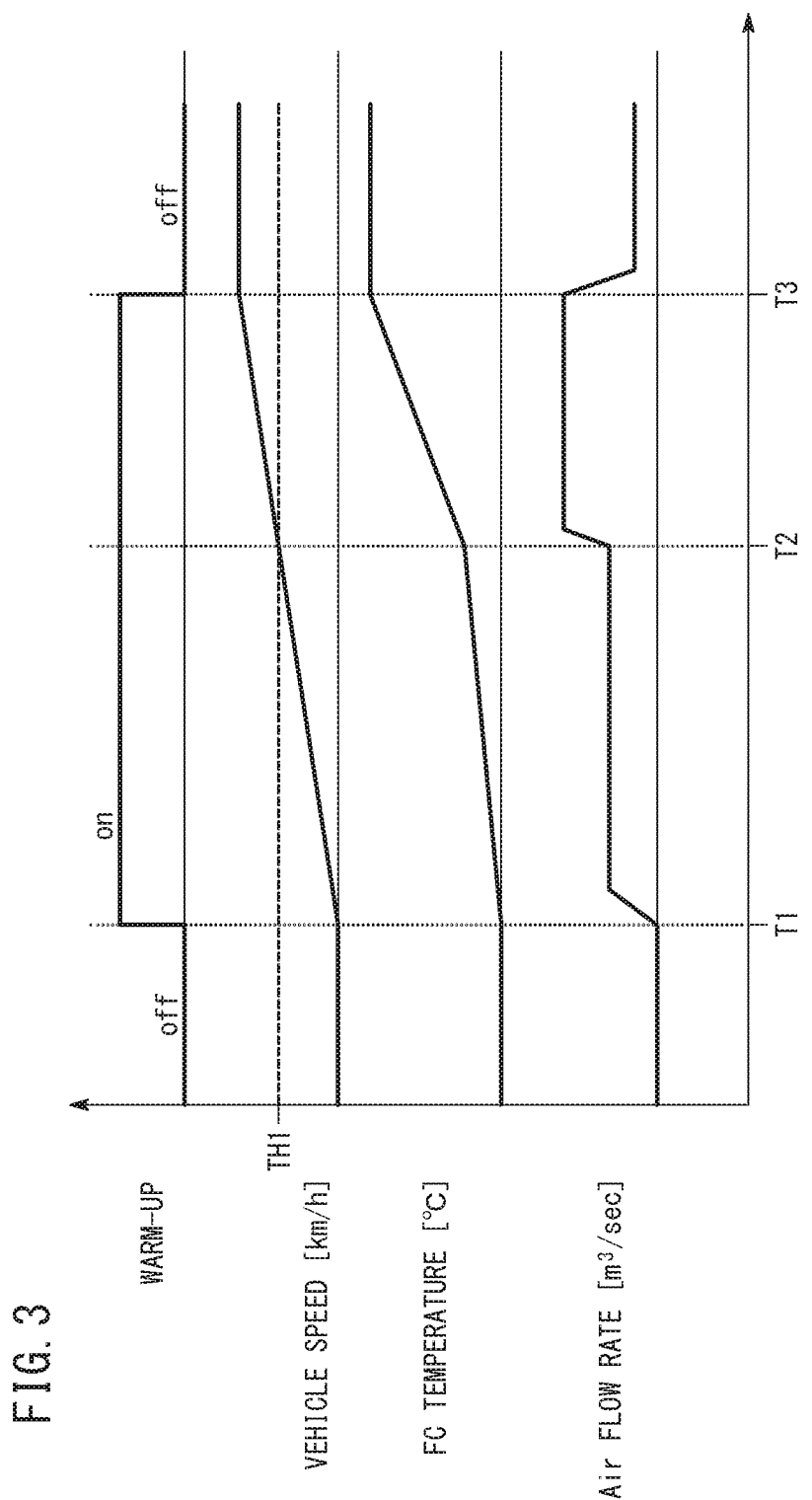
FIG. 3 is a time chart showing an example of operations of the fuel cell system according to the embodiment.

FIG. 3 is a time chart showing an example of operations of the fuel cell system according to the present embodiment. In this instance, in order to simplify the description, an example is illustrated in which the discharge flow rate of the air pump 48 changes depending on the speed of the vehicle 11.

At timing T1, the warm-up operation is initiated. Further, at timing T1, the vehicle 11 starts to travel, and the speed of the vehicle 11, i.e., the vehicle speed V, begins to increase. The timing at which the warm-up operation is initiated, and the timing at which traveling of the vehicle 11 is initiated may coincide with each other, or may not be uniform. Since the warm-up operation is started at timing T1, the temperature of the fuel cell stack 12, i.e., the FC temperature, begins to rise. Since the speed of the vehicle 11 is less than the first threshold value TH1, the warm-up discharge flow rate is set to the first flow rate. Accordingly, the discharge flow rate, which is obtained by adding the first flow rate and the flow rate for normal generation of power, is set as the discharge flow rate, and more specifically, as the air flow rate of the air pump 48. Therefore, the discharge flow rate of the air pump 48 is set to be relatively small. Since the discharge flow rate of the air pump 48 is set to be relatively small, vibration and noise caused by the air pump 48 are relatively small. Since the speed of the vehicle 11 is relatively slow, vibration and noise due to traveling of the vehicle 11 are relatively small. However, since the vibration and noise caused by the air pump 48 are sufficiently small, the user does not become particularly concerned about the vibration and noise caused by the air pump 48. Stated otherwise, it is possible to prevent any sense of discomfort from being imparted to the user.

At timing T2, the speed of the vehicle 11 becomes greater than or equal to the first threshold value TH1. Since the speed of the vehicle 11 is greater than or equal to the first threshold value TH1, the warm-up discharge flow rate is set to the second flow rate. The discharge flow rate, which is obtained by adding the second flow rate and the flow rate for normal generation of power, is set as the discharge flow rate of the air pump 48. Since the discharge flow rate of the air pump 48 is set to be relatively large, vibration and noise caused by the air pump 48 are relatively large. However, since the speed of the vehicle 11 is relatively fast, vibration and noise due to traveling of the vehicle 11 are sufficiently large, and the user does not become particularly concerned about the vibration and noise caused by the air pump 48. Stated otherwise, it is possible to prevent any sense of discomfort from being imparted to the user.

At timing T3, the warm-up operation is brought to an end. Consequently, the flow rate for normal generation of power is set as the discharge flow rate of the air pump 48.

FIG. 4 is a time chart showing another example of operations of the fuel cell system according to the present embodiment. In this instance, in order to simplify the description, an example is illustrated in which the discharge flow rate of the air pump 48 changes depending on the required drive output of the vehicle 11.

At timing T11, the warm-up operation is initiated. Further, at timing T11, the vehicle 11 starts to travel, and the speed of the vehicle 11, i.e., the vehicle speed V, begins to increase. The timing at which the warm-up operation is initiated, and the timing at which traveling of the vehicle 11 is initiated may coincide with each other, or may not be uniform. Since the warm-up operation is started at timing T11, the temperature of the fuel cell stack 12, i.e., the FC temperature, begins to rise. Since the required drive output of the vehicle 11 is less than the second threshold value TH2, the warm-up discharge flow rate is set to the third flow rate. Accordingly, the discharge flow rate, which is obtained by adding the third flow rate and the flow rate for normal generation of power, is set as the discharge flow rate, and more specifically, as the air flow rate of the air pump 48. Therefore, the discharge flow rate of the air pump 48 is set to be relatively small. Since the discharge flow rate of the air pump 48 is set to be relatively small, vibration and noise caused by the air pump 48 are relatively small. Since the required drive output of the vehicle 11 is relatively small, vibration and noise due to traveling of the vehicle 11 are relatively small. However, since the vibration and noise caused by the air pump 48 are sufficiently small, the user does not become particularly concerned about the vibration and noise caused by the air pump 48. Stated otherwise, it is possible to prevent any sense of discomfort from being imparted to the user.

At timing T12, the required drive output of the vehicle 11 becomes greater than or equal to the second threshold value TH2. Since the required drive output of the vehicle 11 is greater than or equal to the second threshold value TH2, the warm-up discharge flow rate is set to the fourth flow rate. The discharge flow rate, which is obtained by adding the fourth flow rate and the flow rate for normal generation of power, is set as the discharge flow rate of the air pump 48. Since the discharge flow rate of the air pump 48 is set to be relatively large, vibration and noise caused by the air pump 48 are relatively large. However, since the required drive output of the vehicle 11 is relatively large, vibration and noise due to traveling of the vehicle 11 are sufficiently large, and the user does not become particularly concerned about the vibration and noise caused by the air pump 48. Stated otherwise, it is possible to prevent any sense of discomfort from being imparted to the user.

At timing T13, the warm-up operation is brought to an end. Consequently, the flow rate for normal generation of power is set as the discharge flow rate of the air pump 48.

In the foregoing manner, according to the present embodiment, the discharge flow rate of the air pump 48 when warming up the fuel cell stack 12 is switched depending on the speed of the vehicle 11 or the required drive output of the vehicle 11. The discharge flow rate is increased in the case that the speed of the vehicle 11 or the required drive output of the vehicle 11 is greater than or equal to a predetermined threshold value, whereas the discharge flow rate is decreased in the case that the speed of the vehicle 11 or the required drive output of the vehicle 11 is less than the predetermined threshold value. According to the present embodiment, when vibration and noise due to traveling of the vehicle 11 are relatively small, the discharge flow rate of the air pump 48 becomes relatively small, and therefore, the vibration and noise caused by the air pump 48 can be kept relatively small. On the other hand, since the vibration and noised caused by the air pump 48 become relatively large when the vibration and noise due to traveling of the vehicle 11 become relatively large, the user does not become particularly concerned about the vibration and noise caused by the air pump 48. Therefore, according to the present embodiment, it is possible to provide the fuel cell system 10, which is capable of performing the warm-up process while preventing any sense of discomfort from being imparted to the user.

Modified Embodiments

Although preferred embodiments of the present invention have been described above, the present invention is not limited to the above-described embodiments, and various modifications can be made thereto without departing from the essence and scope of the present invention.

For example, in the above-described embodiment, in the case that the speed of the vehicle 11 is less than the first threshold value TH1, the warm-up discharge flow rate is set to the first flow rate, whereas in the case that the speed of the vehicle 11 is greater than or equal to the first threshold value TH1, the warm-up discharge flow rate is set to the second flow rate. In other words, according to the above-described embodiment, only one threshold value relating to the speed of the vehicle 11 is used. However, the present invention is not limited to this feature. A plurality of threshold values relating to the speed of the vehicle 11 may be used. In the case that the first threshold value TH1, and a third threshold value TH3 which is larger than the first threshold value TH1 are used as threshold values relating to the speed of the vehicle 11, the following results are brought about. More specifically, in the case that the speed of the vehicle 11 is less than the first threshold value TH1, the warm-up discharge flow rate is set to the first flow rate. In the case that the speed of the vehicle 11 is greater than or equal to the first threshold value TH1 and less than the third threshold value TH3, the warm-up discharge flow rate is set to the second flow rate. In the case that the speed of the vehicle 11 is greater than or equal to the third threshold value TH3, the warm-up discharge flow rate is set to a fifth flow rate which is larger than the second flow rate.

Further, according to the present embodiment, in the case that the required drive output of the vehicle 11 is less than the second threshold value TH2, the warm-up discharge flow rate is set to the third flow rate. In addition, in the case that the required drive output of the vehicle 11 is greater than or equal to the second threshold value TH2, the warm-up discharge flow rate is set to the fourth flow rate. In other words, according to the above-described embodiment, only one threshold value relating to the required drive output of the vehicle 11 is used. However, the present invention is not limited to this feature. A plurality of threshold values relating to the required drive output of the vehicle 11 may be used. In the case that the second threshold value TH2, and a fourth threshold value TH4 which is larger than the second threshold value TH2 are used as threshold values relating to the required drive output of the vehicle 11, the following results are brought about. More specifically, in the case that the required drive output of the vehicle 11 is less than the second threshold value TH2, the warm-up discharge flow rate is set to the third flow rate. In the case that the required drive output of the vehicle 11 is greater than or equal to the second threshold value TH2 and less than the fourth threshold value TH4, the warm-up discharge flow rate is set to the fourth flow rate. In the case that the required drive output of the vehicle 11 is greater than or equal to the fourth threshold value TH4, the warm-up discharge flow rate is set to a sixth flow rate which is larger than the forth flow rate.

Further, according to the above-described embodiment, although an exemplary case has been described in which the warm-up operation is carried out by opening the drain valve 39 provided in the connection line 37, the present invention is not limited to this feature. The present invention can also be applied to various fuel cell systems in which performance of a warm-up operation is required.

The above embodiments can be summarized in the following manner.

The fuel cell system (10) comprises the fuel cell (12), the air pump (48) configured to supply air to the fuel cell, the discharge flow rate determination unit (65) configured to determine the discharge flow rate of the air pump when warming up the fuel cell, in accordance with the speed of the vehicle (11) in which the fuel cell and the air pump are installed, or the required drive output of the vehicle, and the control unit (64) configured to control the air pump on the basis of the discharge flow rate determined by the discharge flow rate determination unit, wherein the discharge flow rate determination unit increases the discharge flow rate in the case that the speed or the required drive output is greater than or equal to a predetermined threshold value, and decreases the discharge flow rate in the case that the speed or the required drive output is less than the predetermined threshold value. In accordance with such a configuration, when vibration and noise due to traveling of the vehicle are relatively small, the discharge flow rate of the air pump becomes relatively small, and therefore, the vibration and noise caused by the air pump can be kept relatively small. On the other hand, since the vibration and noised caused by the air pump become relatively large when the vibration and noise due to traveling of the vehicle become relatively large, the user does not become particularly concerned about the vibration and noise caused by the air pump. Therefore, in accordance with such a configuration, it is possible to provide a fuel cell system which is capable of performing a warm-up process while preventing any sense of discomfort from being imparted to the user.

The fuel cell system may further comprise the first determination unit (66) configured to determine, on the basis of the speed, the warm-up discharge flow rate, which is a discharge flow rate determined from among the discharge flow rates of the air pump that is used for warming up the fuel cell, and the second determination unit (68) configured to determine the warm-up discharge flow rate on the basis of the required drive output, wherein the discharge flow rate determination unit is configured to determine the discharge flow rate of the air pump based on the warm-up discharge flow rate determined by the first determination unit and the warm-up discharge flow rate determined by the second determination unit. In accordance with such a configuration, the discharge flow rate of the air pump is determined appropriately based on the speed of the vehicle and the required drive output. Therefore, in accordance with such a configuration, it is possible to provide the fuel cell system which is capable of performing a warm-up process while more suitably preventing any sense of discomfort from being imparted to the user.

The first determination unit may determine that the warm-up discharge flow rate is the first flow rate in the case that the speed is less than the first threshold value (TH1), and may determine that the warm-up discharge flow rate is the second flow rate that is larger than the first flow rate in the case that the speed is greater than or equal to the first threshold value. In addition, the second determination unit may determine that the warm-up discharge flow rate is the third flow rate in the case that the required drive output is less than the second threshold value (TH2), and may determine that the warm-up discharge flow rate is the fourth flow rate that is larger than the third flow rate in the case that the required drive output is greater than or equal to the second threshold value.

The fuel cell system may further comprise the selection unit (70) configured to select the larger one from among the warm-up discharge flow rate determined by the first determination unit and the warm-up discharge flow rate determined by the second determination unit, wherein the discharge flow rate determination unit determines the discharge flow rate of the air pump based on the warm-up discharge flow rate selected by the selection unit. In accordance with such a configuration, since the larger one from among the warm-up discharge flow rate determined by the first determination unit and the warm-up discharge flow rate determined by the second determination unit is selected, it is possible to more reliably prevent any sense of discomfort from being imparted to the user.

In the control method for the fuel cell system, in which there are included the fuel cell, and the air pump configured to supply air to the fuel cell, the control method comprises the step (step S8) of determining the discharge flow rate of the air pump when warming up the fuel cell, on the basis of the speed of the vehicle in which the fuel cell and the air pump are installed, or the required drive output of the vehicle, and the step (step S9) of controlling the air pump on the basis of the discharge flow rate determined in the step of determining the discharge flow rate, wherein, in the step of determining the discharge flow rate, the discharge flow rate is increased in the case that the speed or the required drive output is greater than or equal to a predetermined threshold value, and the discharge flow rate is decreased in the case that the speed or the required drive output is less than the predetermined threshold value.

The non-transitory computer-readable storage medium in which the program is stored is provided. The computer is provided in the fuel cell system that includes the fuel cell and the air pump configured to supply air to the fuel cell. The program serves to execute in the computer the step of determining a discharge flow rate of the air pump when warming up the fuel cell, on the basis of the speed of the vehicle in which the fuel cell and the air pump are installed, or the required drive output of the vehicle, and the step of controlling the air pump on the basis of the discharge flow rate determined in the step of determining the discharge flow rate of the air pump, wherein, in the step of determining the discharge flow rate, the discharge flow rate is increased in the case that the speed or the required drive output is greater than or equal to a predetermined threshold value, and the discharge flow rate is decreased in the case that the speed or the required drive output is less than the predetermined threshold value.

What is claimed is:

1. A fuel cell system comprising:
   a fuel cell;
   an air pump configured to supply air to the fuel cell; and
   one or more processors that execute computer-executable instructions stored in a memory,
   wherein the one or more processors execute the computer-executable instructions to cause the fuel cell system to:
   determine a discharge flow rate of the air pump when warming up the fuel cell, in accordance with a speed of a vehicle in which the fuel cell and the air pump are installed, or a required drive output of the vehicle,
   control the air pump on a basis of the discharge flow rate determined by the discharge flow rate determination unit,
   in determining the discharge flow rate, increase the discharge flow rate in a case that the speed or the required drive output is greater than or equal to a predetermined threshold value, and decrease the discharge flow rate in a case that the speed or the required drive output is less than the predetermined threshold value,
   in a first determination, determine, on a basis of the speed, a warm-up discharge flow rate, which is a discharge flow rate determined form among the discharge flow rates of the air pump that is used for warming up the fuel cell,
   in a second determination, determine the warm-up discharge flow rate on a basis of the required drive output,
   in determining the discharge flow rate, determine the discharge flow rate of the air pump based on the warm-up discharge flow rate determined at the first determination and the warm-up discharge flow rate determined at the second determination,
   in the first determination, determine that the warm-up discharge flow rate is a first flow rate in a case that the speed is less than a first threshold value, and determine that the warm-up discharge flow rate is a second flow rate that is larger than the first flow rate in a case that the speed is greater than or equal to the first threshold value, and
   in the second determination, determine that the warm-up discharge flow rate is a third flow rate in a case that the required drive output is less than a second threshold value, and determine that the warm-up discharge flow rate is a fourth flow rate that is larger than the third flow rate in a case that the required drive output is greater than or equal to the second threshold value.

2. The fuel cell system according to claim 1, further comprising:
   a selection unit configured to select a larger one from among the warm-up discharge flow rate determined by the first determination unit and the warm-up discharge flow rate determined by the second determination unit;
   wherein the discharge flow rate determination unit determines the discharge flow rate of the air pump based on the warm-up discharge flow rate selected by the selection unit.

3. A control method for a fuel cell system including a fuel cell, and an air pump configured to supply air to the fuel cell, the control method comprising:
   a step of determining a discharge flow rate of the air pump when warming up the fuel cell, on a basis of a speed of a vehicle in which the fuel cell and the air pump are installed, or a required drive output of the vehicle; and a step of controlling the air pump on a basis of the discharge flow rate determined in the step of determining the discharge flow rate;

wherein, in the step of determining the discharge flow rate, the discharge flow rate is increased in a case that the speed or the required drive output is greater than or equal to a predetermined threshold value, and the discharge flow rate is decreased in a case that the speed or the required drive output is less than the predetermined threshold value, the control method further comprising:

a first determination step of determining, on a basis of the speed, a warm-up discharge flow rate, which is a discharge flow rate determined from among the discharge flow rates of the air pump that is used for warming up the fuel cell; and a second determination step of determining the warm-up discharge flow rate on a basis of the required drive output, wherein in the step of determining the discharge flow rate, the discharge flow rate of the air pump is determined based on the warm-up discharge flow rate determined at the first determination step and the warm-up discharge flow rate determined at the second determination step, wherein in the first determination step, the warm-up discharge flow rate is determined as a first flow rate in a case that the speed is less than a first threshold value, and that the warm-up discharge flow rate is determined as a second flow rate that is larger than the first flow rate in a case that the speed is greater than or equal to the first threshold value, and wherein in the second determination step, the warm-up discharge flow rate is determined as a third flow rate in a case that the required drive output is less than a second threshold value, and the warm-up discharge flow rate is determined as a fourth flow rate that is larger than the third flow rate in a case that the required drive output is greater than or equal to the second threshold value.

4. A non-transitory computer-readable storage medium in which a program is stored, wherein a computer is provided in a fuel cell system that includes a fuel cell and an air pump configured to supply air to the fuel cell, and the program serves to execute in the computer:

a step of determining a discharge flow rate of the air pump when warming up the fuel cell, on a basis of a speed of a vehicle in which the fuel cell and the air pump are installed, or a required drive output of the vehicle; and a step of controlling the air pump on a basis of the discharge flow rate determined in the step of determining the discharge flow rate of the air pump;

wherein, in the step of determining the discharge flow rate, the discharge flow rate is increased in a case that the speed or the required drive output is greater than or equal to a predetermined threshold value, and the discharge flow rate is decreased in a case that the speed or the required drive output is less than the predetermined threshold value, the program further comprising:

a first determination step of determining, on a basis of the speed, a warm-up discharge flow rate, which is a discharge flow rate determined from among the discharge flow rates of the air pump that is used for warming up the fuel cell; and a second determination step of determining the warm-up discharge flow rate on a basis of the required drive output, wherein in the step of determining the discharge flow rate, the discharge flow rate of the air pump is determined based on the warm-up discharge flow rate determined at the first determination step and the warm-up discharge flow rate determined at the second determination step, wherein in the first determination step, the warm-up discharge flow rate is determined as a first flow rate in a case that the speed is less than a first threshold value, and that the warm-up discharge flow rate is determined as a second flow rate that is larger than the first flow rate in a case that the speed is greater than or equal to the first threshold value, and wherein in the second determination step, the warm-up discharge flow rate is determined as a third flow rate in a case that the required drive output is less than a second threshold value, and the warm-up discharge flow rate is determined as a fourth flow rate that is larger than the third flow rate in a case that the required drive output is greater than or equal to the second threshold value.

* * * * *